US00RE49086E

(19) United States
(12) Reissued Patent
Onodera et al.

(10) Patent Number: US RE49,086 E
(45) Date of Reissued Patent: May 31, 2022

(54) PRINTER

(71) Applicant: SATO HOLDINGS KABUSHIKI KAISHA, Tokyo (JP)

(72) Inventors: Hitoshi Onodera, Saitama (JP); Takayoshi Jinnouchi, Saitama (JP)

(73) Assignee: SATO HOLDINGS KABUSHIKI KAISHA, Tokyo (JP)

(21) Appl. No.: 16/419,300

(22) Filed: May 22, 2019

Related U.S. Patent Documents

Reissue of:

(64) Patent No.: 9,662,911
Issued: May 30, 2017
Appl. No.: 15/107,680
PCT Filed: Dec. 25, 2014
PCT No.: PCT/JP2014/084333
§ 371 (c)(1),
(2) Date: Jun. 23, 2016
PCT Pub. No.: WO2015/099055
PCT Pub. Date: Jul. 2, 2015

(30) Foreign Application Priority Data

Dec. 26, 2013 (JP) ..... 2013-268264

(51) Int. Cl.

| | |
|---|---|
| ***B41J 15/04*** | (2006.01) |
| ***B41J 3/407*** | (2006.01) |
| ***B41J 11/00*** | (2006.01) |
| ***B41J 25/312*** | (2006.01) |

(52) U.S. Cl.
CPC ..... *B41J 15/042* (2013.01); *B41J 3/4075* (2013.01); *B41J 11/0005* (2013.01); *B41J 25/312* (2013.01)

(58) Field of Classification Search
CPC .... B41J 15/042; B41J 11/0005; B41J 3/4075; B41J 25/312
See application file for complete search history.

(56) References Cited

U.S. PATENT DOCUMENTS

| | | | |
|---|---|---|---|
| 4,844,632 | A | 7/1989 | Minowa |
| 5,366,302 | A | 11/1994 | Masumura et al. |
| 5,379,056 | A | 1/1995 | Walter et al. |
| 5,448,281 | A | 9/1995 | Walter et al. |
| 5,547,293 | A | 8/1996 | Koch et al. |
| 5,638,104 | A | 6/1997 | Suzuki et al. |

(Continued)

FOREIGN PATENT DOCUMENTS

| | | | |
|---|---|---|---|
| EP | 0 645 253 | A1 | 3/1995 |
| EP | 0 728 590 | A1 | 8/1996 |

(Continued)

OTHER PUBLICATIONS

Chinese Office Action and English translation, Application No. 201480070617.9, Jan. 4, 2017, 11 pages.

(Continued)

*Primary Examiner* — Krisanne M Jastrzab
(74) *Attorney, Agent, or Firm* — Foley & Lardner LLP

(57) ABSTRACT

In a printer that performs printing on a label of a continuous paper while feeding the continuous paper unwound from a paper sheet supply unit to a side of a printing head portion via a damper portion, a head pressure plate is arranged between an operating portion that adjusts a pressing force against a thermal head portion and a printing line of the thermal head portion such that the head pressure plate is formed extended to connect them.

19 Claims, 17 Drawing Sheets

(56) References Cited

U.S. PATENT DOCUMENTS

| | | | | |
|---|---|---|---|---|
| 5,903,298 | A | 5/1999 | Takeuchi et al. | |
| 5,917,533 | A | 6/1999 | Suzuki et al. | |
| 5,940,108 | A | 8/1999 | Ito | |
| 6,276,848 | B1 | 8/2001 | Takizawa et al. | |
| 6,398,434 | B1 | 6/2002 | Corrigan, Jr. | B41J 2/32 347/197 |
| 6,788,326 | B2 | 9/2004 | Sasaki | |
| 7,495,685 | B2 | 2/2009 | Takasaka et al. | |
| 8,040,366 | B2 * | 10/2011 | Yaguchi | B41J 2/325 347/212 |
| 8,441,509 | B2 * | 5/2013 | Matsuoka | B41J 2/325 347/212 |
| 8,553,054 | B2 * | 10/2013 | Yasumatsu | B41M 5/38264 347/176 |
| 9,193,195 | B1 * | 11/2015 | Kondo | B41J 2/16523 |
| 9,193,196 | B1 * | 11/2015 | Meyer | B41J 29/02 |
| 2002/0080223 | A1 * | 6/2002 | Connor | B41J 25/312 347/198 |
| 2003/0184640 | A1 | 10/2003 | Sasaki | |
| 2005/0243159 | A1 | 11/2005 | Nakatani | |
| 2006/0216092 | A1 | 9/2006 | Ueda et al. | |
| 2007/0058029 | A1 | 3/2007 | Takahashi | |
| 2008/0267682 | A1 | 10/2008 | Osawa et al. | |
| 2010/0045764 | A1 | 2/2010 | Abe et al. | |
| 2013/0286136 | A1 * | 10/2013 | Gao | B41J 15/042 347/198 |
| 2014/0369728 | A1 * | 12/2014 | Hatazaki | G03G 15/2064 399/329 |

FOREIGN PATENT DOCUMENTS

| | | | |
|---|---|---|---|
| GB | 2 280 874 | A | 2/1995 |
| JP | 55-159987 | A | 12/1980 |
| JP | 58-175052 | U | 11/1983 |
| JP | 62-282947 | | 12/1987 |
| JP | 63-099966 | | 5/1988 |
| JP | 03-066759 | U | 6/1991 |
| JP | 05-012152 | A | 2/1993 |
| JP | 05-138982 | A | 6/1993 |
| JP | 05-238101 | A | 9/1993 |
| JP | 06-219014 | A | 8/1994 |
| JP | 06-081743 | U | 11/1994 |
| JP | 06-320829 | A | 11/1994 |
| JP | 07-005744 | U | 1/1995 |
| JP | 07-025042 | A | 1/1995 |
| JP | 07-137315 | | 5/1995 |
| JP | 07-232465 | | 9/1995 |
| JP | 07-242037 | | 9/1995 |
| JP | 07-242038 | | 9/1995 |
| JP | 07-329395 | A | 12/1995 |
| JP | 08-295063 | A | 11/1996 |
| JP | 08-337029 | | 12/1996 |
| JP | 09-216436 | | 8/1997 |
| JP | 09-286127 | | 11/1997 |
| JP | 10-044553 | | 2/1998 |
| JP | 10-114091 | | 5/1998 |
| JP | 10-119324 | | 5/1998 |
| JP | 10-181148 | A | 7/1998 |
| JP | 10-193726 | | 7/1998 |
| JP | 10-193738 | | 7/1998 |
| JP | 10-305600 | | 11/1998 |
| JP | 11-020264 | | 1/1999 |
| JP | 11-099725 | | 4/1999 |
| JP | 11-099726 | | 4/1999 |
| JP | 11-099726 | A | 4/1999 |
| JP | 2000-318256 | A | 11/2000 |
| JP | 2003-291385 | A | 10/2003 |
| JP | 2004-098699 | A | 4/2004 |
| JP | 2004-255730 | A | 9/2004 |
| JP | 2005-028605 | A | 2/2005 |
| JP | 2005-193396 | A | 7/2005 |
| JP | 2006-335021 | A | 12/2006 |
| JP | 2007-076662 | A | 3/2007 |
| JP | 2007-168350 | A | 7/2007 |
| JP | 2007-301869 | A | 11/2007 |
| JP | 2008-254426 | A | 10/2008 |
| JP | 2010-049743 | A | 3/2010 |
| JP | 2010-253788 | A | 11/2010 |
| JP | 2012-016896 | A | 1/2012 |
| JP | 2013-216041 | A | 10/2013 |
| JP | 2016-104531 | A | 6/2016 |

OTHER PUBLICATIONS

Japanese Office Action, Application No. 2013-268264 and English translation, Sep. 25, 2017, 6 pages.

Supplementary European Search Report, Application No. 14 87 5569, dated Oct. 16, 2017, 6 pages.

English translation of Japanese Office Action, Application No. 2019-084975, dated of drafting Mar. 6, 2020, 13 pages.

* cited by examiner

PRINTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates a printer, for example, a printer having a label printing function that prints desired information, such as a character, a sign, a diagram, a barcode, or similar information, on a label or a similar printing medium.

BACKGROUND ART

A label printer is a printer having a function that, for example, while unwinding a rolled continuous paper to feed the continuous paper in a sheet-shape, prints desired information on a label of the continuous paper.

At a printing unit of this label printer, a thermal head portion, which performs printing on the label, and a platen roller portion, which feeds the continuous paper, are disposed in a mutually opposing state.

For printing, a printing quality is improved by contacting a printing portion of the thermal head portion closely to the label of the continuous paper by the thermal head portion being pressed onto a side of the platen roller portion in a state where the continuous paper is nipped between the thermal head portion and the platen roller portion.

It should be noted that, for example, JP2007-301869A discloses a printer that has such label printing function.

SUMMARY OF INVENTION

For the printer having the label printing function such as the above, how to effectively press the printing portion of printing means is a significant subject. For example, an appropriate printing pressure with which the thermal head portion is pressed onto the platen roller portion differs depending on a thickness and a rigidity of the continuous paper to be printed, thus a printer that can change its printing pressure in such cases is desired.

The present invention has been made in view of the above-described technical background, and it is an object of the present invention to provide a printer that can effectively press the printing portion of the printing means.

To solve the above-described subject, a printer according to a first aspect of the present invention includes a medium supply unit configured to supply a print medium, feeding means configured to feed the print medium supplied from the medium supply unit along a medium feed path, printing means disposed to oppose the feeding means in the medium feed path, the printing means being configured to print on the print medium fed along the medium feed path, and pressing means configured to press the printing means onto the feeding means in a state where the print medium is nipped between the printing means and the feeding means, wherein the pressing means includes a pressing-force adjustment portion configured to adjust a pressing force on the printing means; and a pressing member disposed between the pressing-force adjustment portion and the printing means in a state where the pressing member is extended to connect a pressing portion of the pressing-force adjustment portion and a printing portion of the printing means, the pressing member being configured to transmit the pressing force from the pressing-force adjustment portion to the printing portion.

In a printer according to a second aspect of the present invention of the above-described first aspect, the pressing-force adjustment portion includes an operating portion disposed movably within an operating surface to operate the pressing force on the printing means, a pressure changing unit disposed in a state of being engaged with the operating portion, the pressure changing unit being disposed to be stepwise in order to change the pressing force on the printing means in stages corresponding to a position where the operating portion moves; and an elastic member disposed in the operating portion in order to change the pressing force on the pressing member corresponding to the position where the operating portion moves.

In a printer according to a third aspect of the present invention of the above-described first or second aspect, the pressing member is disposed swingably.

In a printer according to a fourth aspect of the present invention of any one of the above-described first to third aspects, a plurality of the pressing members are disposed along a width direction of the print medium.

Effect of Invention

According to the first aspect, the printing portion of the printing means of the printer can be pressed effectively.

According to the second aspect, the printing portion of the printing means of the printer can be pressed effectively with a simple structure.

According to the third aspect, a height of the pressing member can be adjusted corresponding to the print medium of various thicknesses, thus printing can be performed properly on the print medium of the various thicknesses.

According to the fourth aspect, the print medium of various widths can be pressed properly, thus printing can be performed properly on the print medium of the various widths.

DESCRIPTION OF EMBODIMENTS

Figure 1:
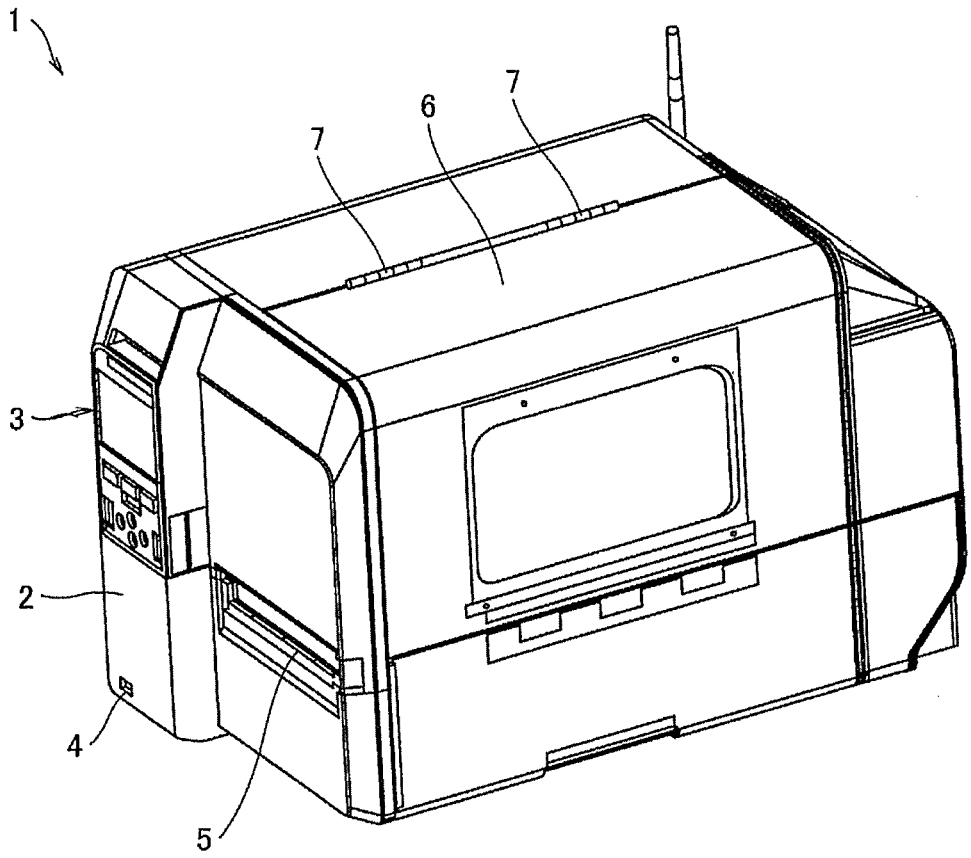
FIG. 1 is an overall perspective view of an appearance of a printer according to one embodiment of the present invention.

The following describes an embodiment as an example of the present invention in detail based on drawings. It should be noted that in the drawings to describe the embodiment, an identical reference numeral is basically attached to an identical component, and its repeated description is omitted.

A feed direction for printing a continuous paper (print medium), specifically a direction feeding the continuous paper from a paper sheet supply unit to a thermal head portion, is referred to as a printing direction, and if there is no specific description, an upstream in the feed direction is referred to as an upstream side in the printing direction, and a downstream in the feed direction is referred to as a downstream side in the printing direction.

FIG. 1 is an overall perspective view of an appearance of a printer according to the embodiment.

A printer 1 according to the embodiment has, for example, a label printing function, which prints information such as a character, a sign, a diagram, a barcode, or similar information, on a label adhered temporarily on a liner sheet.

On a front cover portion 2 at a front of the printer 1, an operational panel unit 3, a power switch 4, and an issue port (medium discharge port) 5 are disposed.

On the operational panel unit 3, an LCD (Liquid Crystal Display), which displays a message or similar information, a plurality of keys (line key, feed key, function key, direction indicating key, cancel key, and similar keys), which operate an operation of the printer 1, and a plurality of LEDs (Light Emitting Diodes), which indicate a state of the printer 1, are disposed.

On one side surface of the printer 1, an open cover portion 6 is openably/closably mounted in a vertical direction by hinge portions 7 at two sites.

Figure 2:
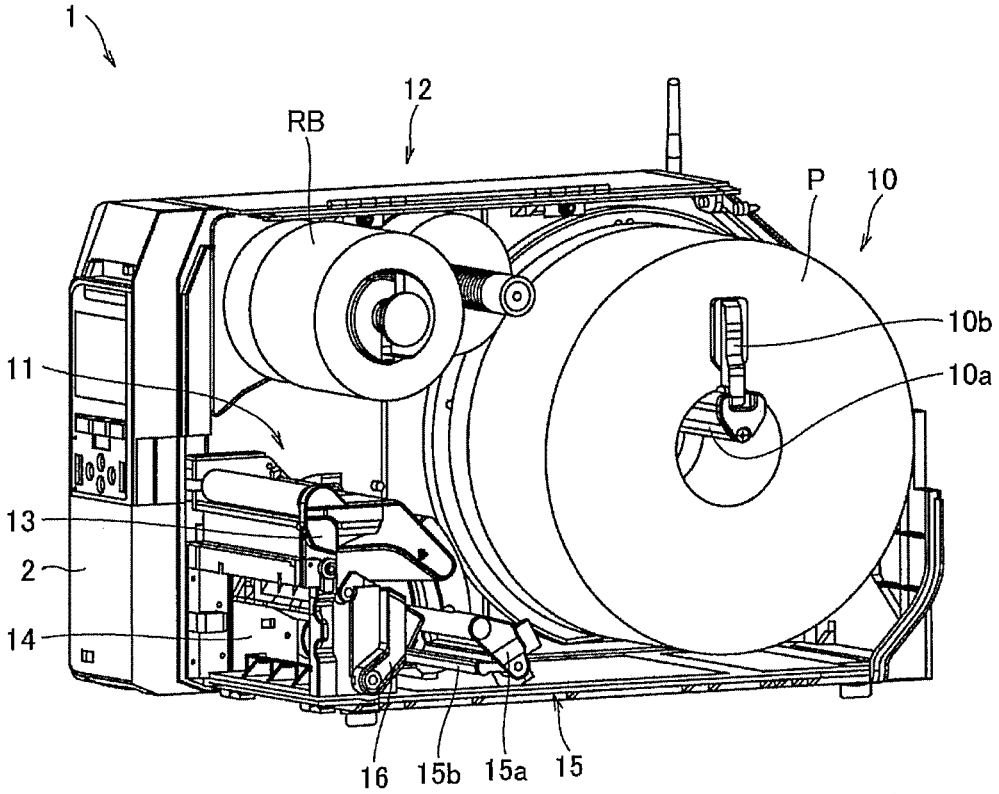
FIG. 2 is a perspective view for illustrating an inside of the printer in FIG. 1.
Figure 3:
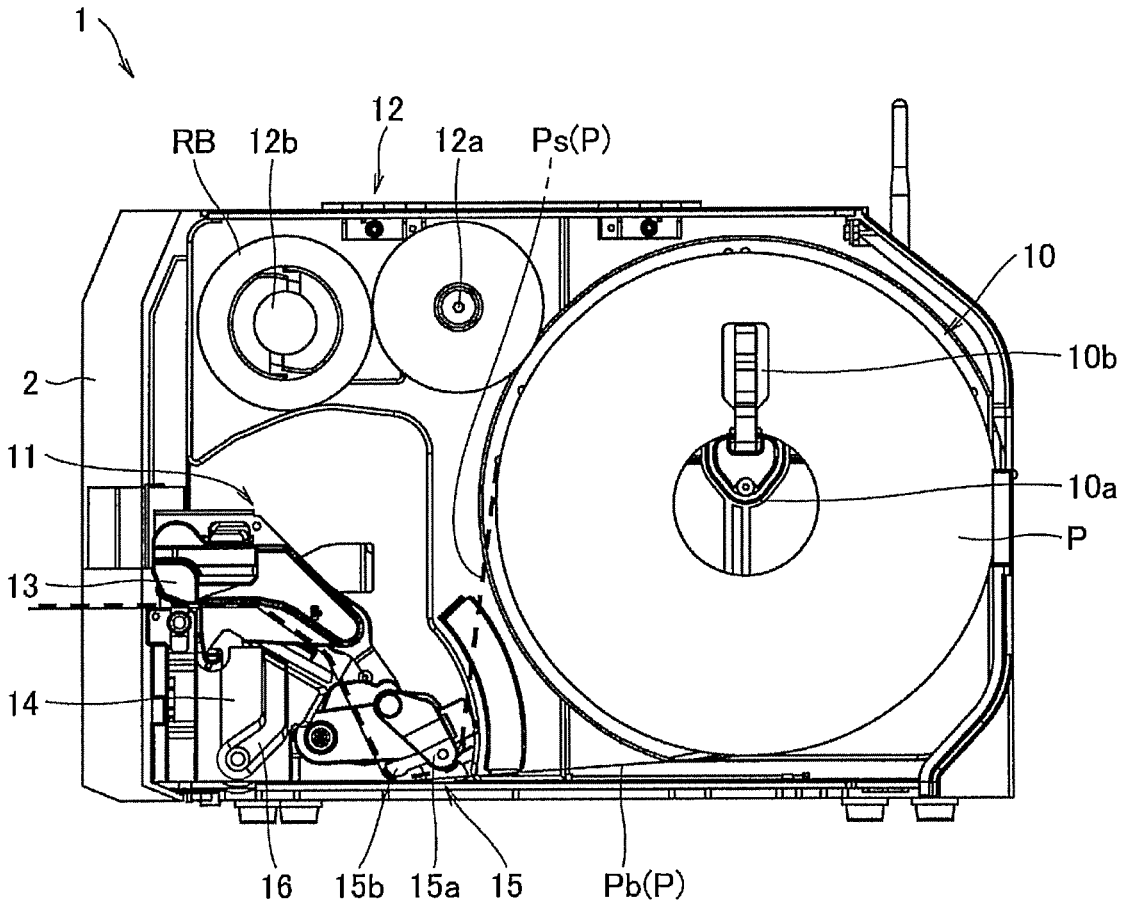
FIG. 3 is a side view of the printer in FIG. 2.

Next, an internal structure of the printer 1 will be described in reference to FIG. 2 and FIG. 3. FIG. 2 is a perspective view for illustrating an inside of the printer in FIG. 1. FIG. 3 is a side view of the printer in FIG. 2. It should be noted that in the following description, a front side of the printer 1 (front cover portion 2 side) is referred to as a front (downstream side in the feed direction of the continuous paper), and its opposite side, and a back side (back cover portion side) is referred to as a rear (at an upstream side in the feed direction of the continuous paper).

Inside the printer 1, a paper sheet supply unit (medium supply unit) 10, which is disposed on its rear side, a printing unit 11, which is disposed on its front side, and an ink ribbon portion 12, which is disposed on its upper side, are installed.

The paper sheet supply unit 10, which is a configuration unit that supplies a continuous paper (print medium) P to the printing unit 11, includes a support shaft 10a and a roll guiding portion 10b, which is installed at one end of the support shaft 10a.

The support shaft 10a is a configuration portion that rotatably supports the continuous paper P rolled up in a rolled shape. The roll guiding portion 10b, which is a configuration portion that fixes the rolled continuous paper P, is movably installed along an axial direction of the support shaft 10a to be able to change its position corresponding to a width of the continuous paper P.

The continuous paper P includes, for example, a long liner sheet and a plurality of labels adhered temporarily at every predetermined interval along a longitudinal direction of the liner sheet. On a surface where an adhesive surface of the label contacts on the liner sheet, a releasing agent such as silicone or similar material is coated, and this ensures the label to be peeled off easily. On a surface where the label is not applied on the liner sheet, position detection marks, which indicate a position of the label, are formed at every predetermined interval along the longitudinal direction. For the label, there is a case where a thermal paper is used and a case where a plain paper is used. In the case of the thermal paper, on its surface, a thermal coloring layer, which develops a specific color (such as black or red) when reaching a predetermined temperature region, is formed.

There are two types of continuous papers P: an outside wound label and an inside wound label. The outside wound label is wound in a state where the label of the continuous paper P is positioned on an outer peripheral surface of the rolled continuous paper P, and as shown in FIG. 3, a continuous paper Ps (P: dashed line) is unwound from around the center in the height direction of the paper sheet supply unit 10 toward a bottom portion of the printing unit 11. In contrast, the inside wound label is wound in a state where the label of the continuous paper P is positioned on an inner peripheral surface of the rolled continuous paper P, and as shown in FIG. 3, a continuous paper Pb (P: solid line) is unwound from around an internal bottom surface of the printer 1 toward the bottom portion of the printing unit 11. It should be noted that for both outside wound and inside wound, paper passing routes of the continuous paper P (Ps, Pb) in the printing unit 11 are identical. For both the outside wound label and the inside wound label, the continuous paper P is fed in a state where a surface where the label is temporarily adhered (printed surface) is upward.

The above-described printing unit 11, which is a configuration unit that performs printing on the label of continuous paper P or a similar print medium, includes a printing head portion 13, a supporting stand 14, which is disposed below the printing head portion 13, and a damper portion 15, which is disposed on a rear (upstream of feed of the continuous paper P at the printing direction) of them.

The printing head portion 13 is, as described below, openably/closably installed inside the printer 1. When the printing head portion 13 is in a closed state, between the printing head portion 13 and the supporting stand 14, the paper passing route (medium feed path) is formed. Then, this paper passing route is coupled to the above-described issue port 5 (see FIG. 1).

On the supporting stand 14, a head lock lever portion 16, which maintains the closed state of the printing head portion 13, is installed. Operating this head lock lever portion 16 releases the closed state of the printing head portion 13 and then a front portion of the printing head portion 13 is lifted to open the printing head portion 13 (the printing head portion 13 separates from a platen roller portion 23).

The damper portion 15 is a configuration portion that gives tension to the continuous paper P. According to the embodiment of the present invention, the damper portion 15, which includes an outer damper portion 15a and an inner damper portion 15b, moves in the vertical direction (opens and closes) in conjunction with an opening and closing of the printing head portion 13. However, in the closed state of the printing head portion 13, the outer damper portion 15a and the inner damper portion 15b are swingably installed such that each can give tension to the continuous paper P.

The above-described ink ribbon portion 12, which is a configuration portion that supplies and rolls up an ink ribbon where printing ink is applied, includes a ribbon supply unit 12a and a ribbon roll up unit 12b, which is disposed on a lateral of a front of the ribbon supply unit 12a. The ribbon supply unit 12a is a configuration unit that rotatably supports the ink ribbon rolled up in a rolled-shape. The ribbon roll up unit 12b is a configuration unit that rolls up and recovers the already printed ink ribbon RB. It should be noted that when using the ink ribbon, the ink ribbon extracted from the ribbon supply unit 12a is passed through below the printing head portion 13, and then rolled up by the ribbon roll up unit 12b.

According to such printer 1, the continuous paper P (Ps, Pb), which is unwound from the paper sheet supply unit 10 in a sheet-shape, is fed to the paper passing route between the printing head portion 13 and the supporting stand 14 via the damper portion 15, and in the middle of this, after a printing process is executed on the label of the continuous paper P or a similar print medium, is discharged outside the printer 1 from the issue port 5.

Figure 4A:
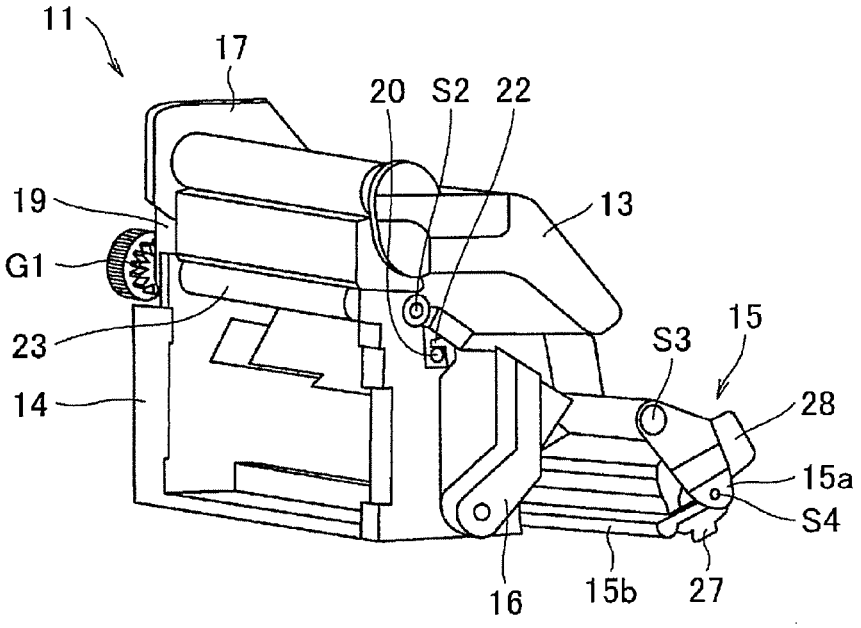
FIG. 4A is an enlarged perspective view where a printing unit in a closed state of a printing head portion in FIG. 3 is viewed from a front.
Figure 4B:
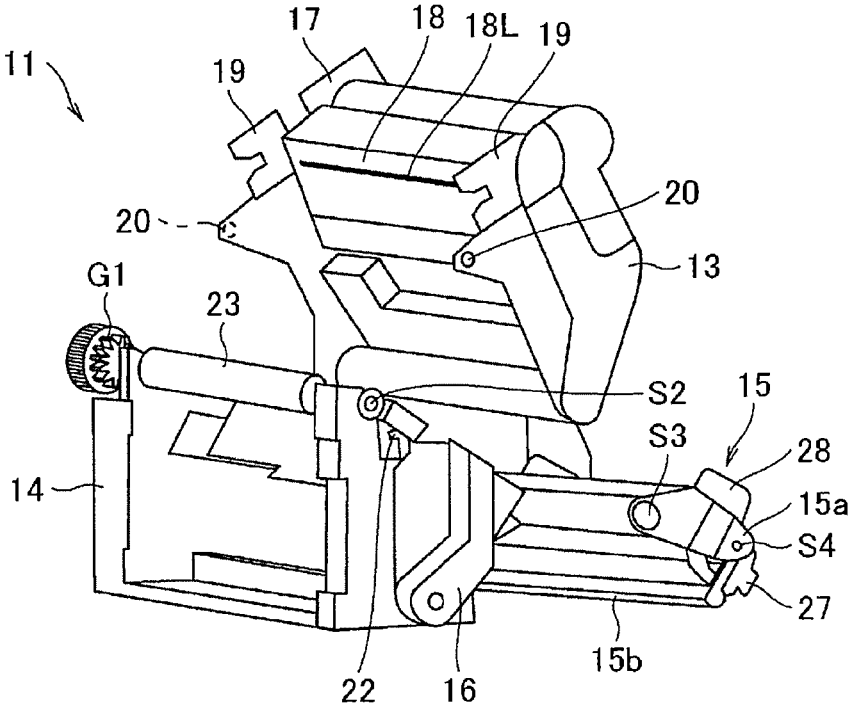
FIG. 4B is an enlarged perspective view where the printing unit in an open state of the printing head portion in FIG. 3 is viewed from the front.
Figure 5:
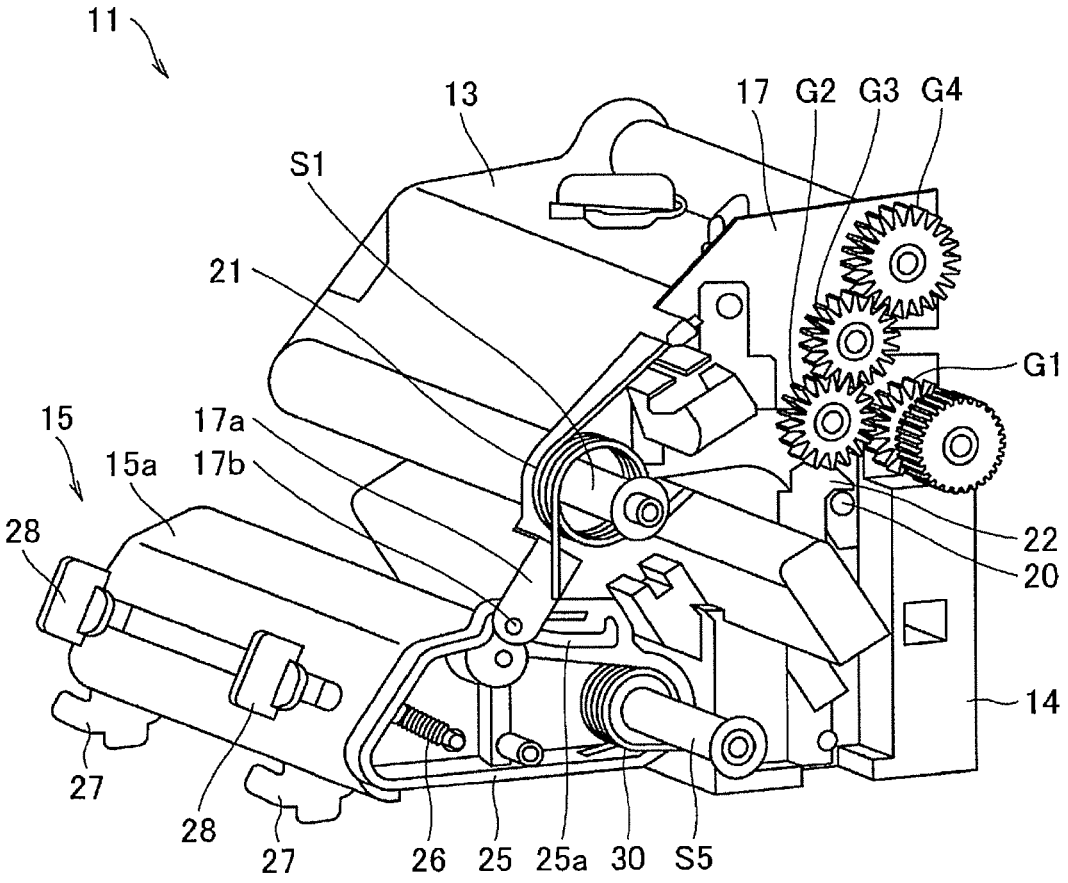
FIG. 5 is an enlarged perspective view where the printing unit in FIG. 4A is viewed from a back side.
Figure 6:
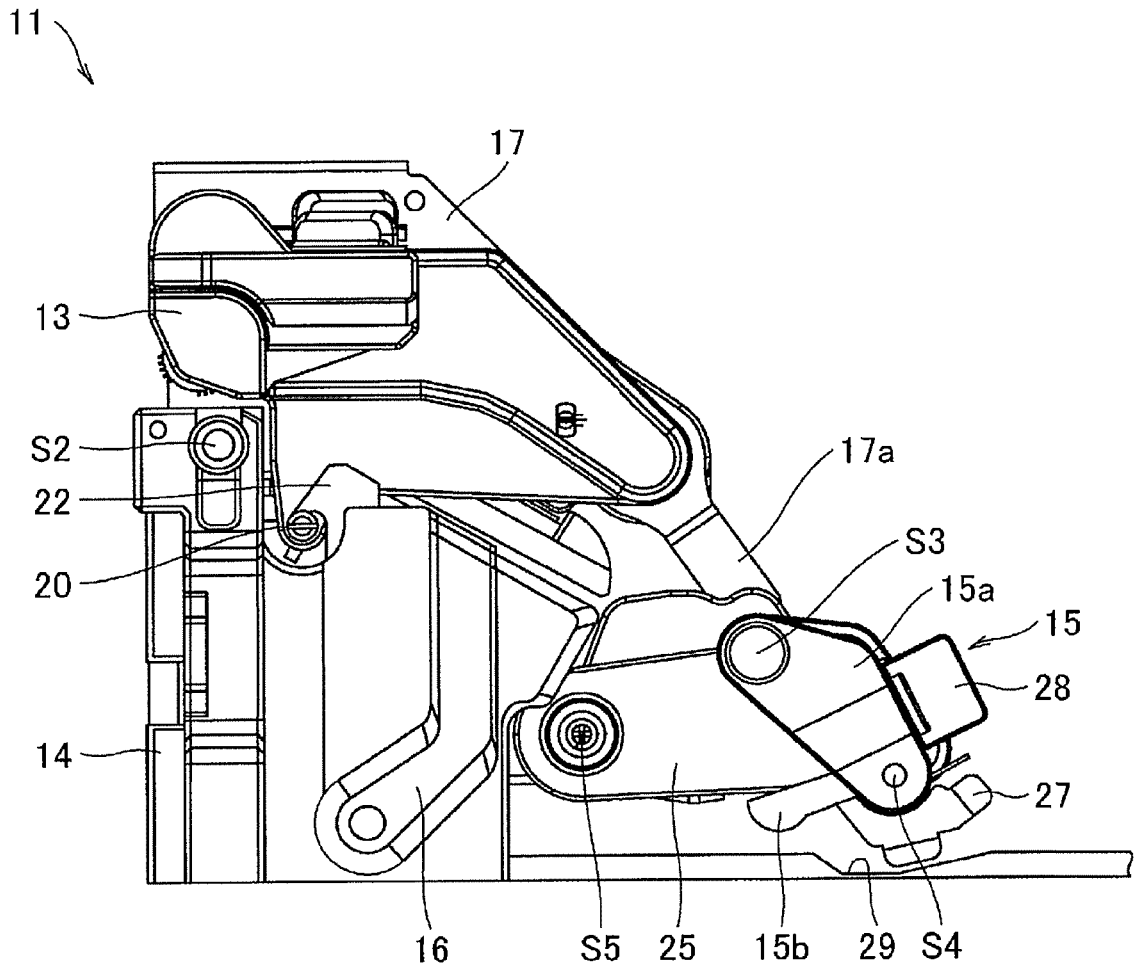
FIG. 6 is an enlarged side view of the printing portion in FIG. 3.
Figure 7:
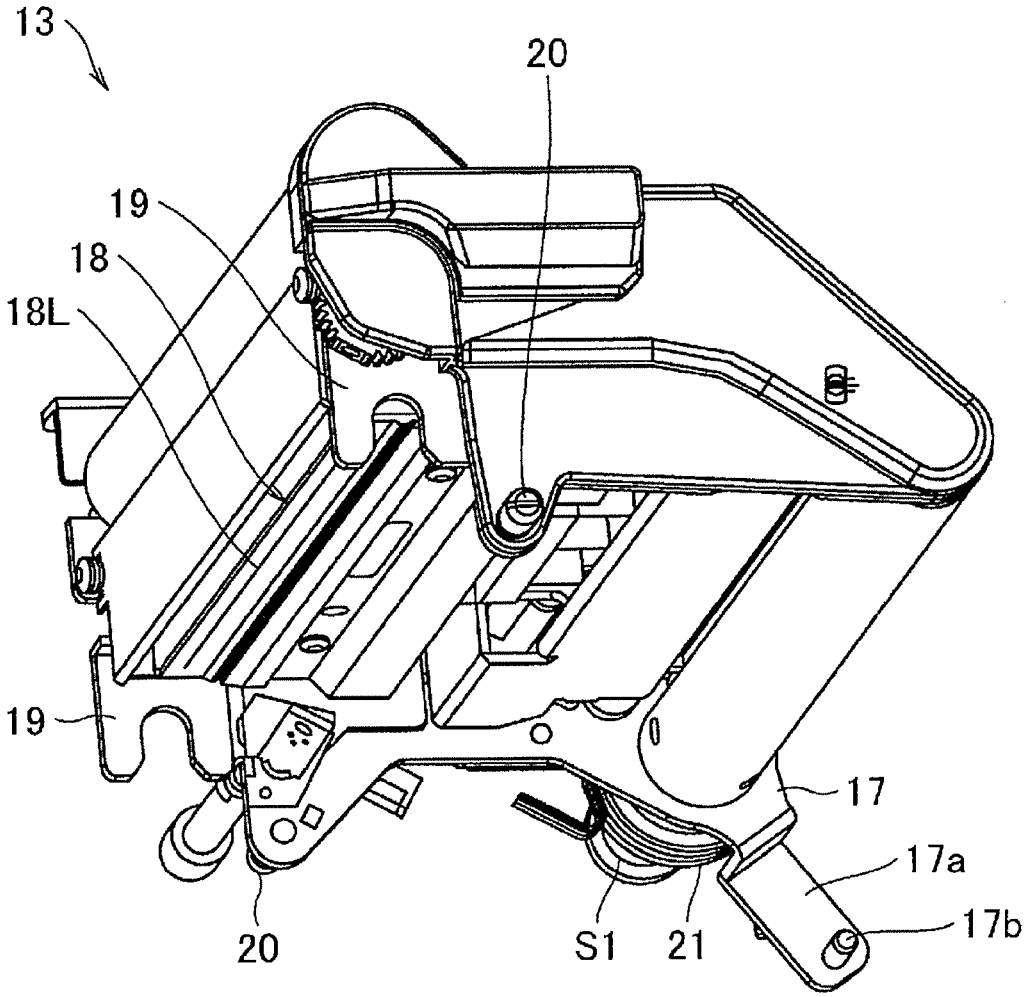
FIG. 7 is a perspective view where a printing head portion in FIG. 6 is extracted and viewed from a lower side.

Next, a configuration of the above-described printing unit 11 will be described in reference to FIG. 4A to FIG. 7. FIG. 4A is an enlarged perspective view where the printing unit in the closed state of the printing head portion in FIG. 3 is viewed from a front. FIG. 4B is an enlarged perspective view where the printing unit in an open state of the printing head portion in FIG. 3 is viewed from the front. FIG. 5 is an enlarged perspective view where the printing unit in FIG. 4A is viewed from a back side. FIG. 6 is an enlarged side view of the printing unit in FIG. 3. FIG. 7 is a perspective view where a printing head portion in FIG. 6 is extracted and viewed from a lower side.

The printing head portion 13 includes the front portion, which is swingably in the vertical direction (that is, openably and closably) supported by a head support plate 17 on one side surface of the printing head portion 13 around a rotary shaft S1 (see FIG. 5 and FIG. 7) of a rear of the printing head portion 13.

On an inferior surface (surface facing the paper passing route) of the printing head portion 13, a thermal head portion 18 (see FIG. 4B and FIG. 7) is installed in a state where its printing surface faces the paper passing route. The thermal head portion 18 is printing means, which performs printing on the label of the continuous paper P and similar print medium with heating resistors of a printing line 18L disposed on a printing surface of the thermal head portion 18. On this printing line 18L, a plurality of heating resistors (heating elements), which generates heat by energization, are arranged along a width direction (direction perpendicular to the feed direction of the continuous paper P) of the continuous paper P.

On an inferior surface of a front side of the printing head portion 13, depressed claw portions 19, 19 (see FIG. 4B and FIG. 7) are disposed so as to sandwich the thermal head portion 18. On an inferior surface of the printing head portion 13, pins 20, 20, which project outward from both side surfaces of the printing head portion 13, are disposed on a rear of the depressed claw portion 19.

While such printing head portion 13 is biased in the opening direction by a torsion spring 21 mounted on the rotary shaft S1 (see FIG. 5 and FIG. 7), the printing head portion 13 is maintained to be in a closed state with lock claw portions 22, 22 of the supporting stand 14 being hooked in the pins 20, 20 on a lower portion of the printing head portion 13. Pulling the above-described head lock lever portion 16 rightward in FIG. 6 moves the lock claw portion 22 rightward in FIG. 6 along with this, thus unhooking the lock claw portion 22 from the pin 20. Unhooking the lock claw portion 22 from the pin 20, as shown in FIG. 4B, automatically opens the printing head portion 13 by biasing force of the torsion spring 21.

In the closed state of the printing head portion 13, while the depressed claw portions 19, 19 of the printing head portion 13 (see FIG. 4B and FIG. 7) are fitted on both end portions of a rotary shaft S2 (see FIG. 4 and FIG. 6) of the platen roller portion 23, a printing surface of the thermal head portion 18 are pressed on the platen roller portion 23 (see FIG. 4A and FIG. 4B), which is below the thermal head portion 18, by a pressing device (pressing means) 24 ([see FIG. 5] *described below*) disposed on the printing head portion 13.

The platen roller portion 23 is feeding means that feeds the continuous paper P unwound from the paper sheet supply unit 10 to the issue port 5 (see FIG. 1) along the paper passing route, and a surface of the platen roller portion 23 is coated with elastic material such as hard rubber. This platen roller portion 23 is rotatably in normal and reverse directions installed on an upper portion of the supporting stand 14. To one end in an axial direction of the rotary shaft S2 of the platen roller portion 23, a gear G1 is coupled. This gear G1, for example, is engaged with a rotary shaft of a driver (not illustrated) such as a stepping motor via such as a timing belt (not illustrated). The gear G1 is coupled to a gear G4 via concatenation gears G2 and G3 (see FIG. 5). It should be noted that the pressing device 24 will be described later in detail.

According to the embodiment, on an end portion on the damper portion 15 side on the head support plate 17, which supports the printing head portion 13, a suppression portion 17a (see FIG. 5 to FIG. 7) is integrally formed. This suppression portion 17a is formed at an opposite position of a front portion of the head support plate 17 with respect to the rotary shaft S1. On a surface facing the damper portion 15 on a distal end of this suppression portion 17a, a pin 17b (see FIG. 7), which projects from its surface, is disposed. The suppression portion 17a and the pin 17b are parts of a mechanism, which opens and closes the damper portion 15 in conjunction with an opening and closing of the printing head portion 13.

This mechanism can make the damper portion 15 move in a vertical direction (opens and closes) in conjunction with the opening and closing of the printing head portion 13. That is, when the printing head portion 13 opens, the damper portion 15 lifts up in conjunction with the printing head portion 13, which widens a width through which the continuous paper P is inserted, and a visibility of a lower portion of the damper portion 15 can be improved. Therefore, the continuous paper P extracted from the paper sheet supply unit 10 can pass through below the damper portion 15 not being caught by a width adjustment guiding portion. Accordingly, an operation to insert the continuous paper P through the paper passing route of the printer 1 can be facilitated.

Additionally, when the printing head portion 13 closes, the damper portion 15 moves down to the original height in conjunction with the printing head portion 13, thus this can prevent leaving the damper portion 15 not closed. Accordingly, a malfunction to print in a state where the continuous paper P is not given tension is prevented. A sequence of inserting operation of the continuous paper P can also be simplified.

Furthermore, a mechanism for opening the damper portion 15 manually is not disposed separately, and an opening mechanism and a closing mechanism of the damper portion 15 are mutually doubled, thus the structure can be simplified and the number of components can be reduced. Accordingly, a cost of the printer 1 can be reduced and downsizing of the printer 1 can be advanced.

It should be noted that in the paper passing route of the printing unit 11, between the thermal head portion 18 and the damper portion 15, a paper-sheet-position detecting sensor (not illustrated) is disposed. This paper-sheet-position detecting sensor, which is a sensor that detects a label position of the continuous paper P by detecting the position detection mark disposed on the continuous paper P or a liner sheet part between adjacent labels, for example, is constituted of a light reflection type or light transmission type sensor.

At the printing process, the continuous paper P is fed by rotating the platen roller portion 23 in a state where the thermal head portion 18 is pressed on a side of the platen roller portion 23 by the pressing device 24 while the continuous paper P is nipped between the thermal head portion 18 and the platen roller portion 23. Then, based on information detected by the paper-sheet-position detecting sensor, a printing timing is determined, and the heating resistors of the printing line 18L are selectively heated by a printing signal transmitted to the thermal head portion 18. Thus, desired information, such as a character, a sign, a diagram, a barcode, or similar information, is printed on the label of the continuous paper P.

On the other hand, the outer damper portion 15a of the damper portion 15, when viewing a side surface of the printing unit 11, extends obliquely downward from a front side to a rear side, and is supported by a damper supporting member 25 around a rotary shaft S3 of the front side (see FIG. 4A, FIG. 4B and FIG. 6) in a state where the rear portion is swingable in the vertical direction. It should be noted that a coil spring 26 in FIG. 5 is a member that inhibits the outer damper portion 15a from going excessively to an upper side (rear side), swingably supports the outer damper portion 15a.

The inner damper portion 15b of the damper portion 15, when viewing the side surface of the printing unit 11, extends obliquely downward from the rear side to the front side in contrast to the outer damper portion 15a, and is supported by the rear portion of the outer damper portion 15a around a rotary shaft S4 (see FIG. 4A, FIG. 4B and FIG. 6) on the rear side in a state where a front portion is swingable in the vertical direction.

At the printing process, a paper sheet contact portion of the inner damper portion 15b is positioned on a downstream of feed of the continuous paper P with respect to a paper sheet contact portion of the outer damper portion 15a. That is, the paper sheet contact portion of the inner damper portion 15b is disposed between the printing head portion 13 and the paper sheet contact portion of the outer damper portion 15a.

At a phase before passing through the paper, a height of the paper sheet contact portion of the inner damper portion 15b is disposed at a lower position than a height of the paper sheet contact portion of the outer damper portion 15a. That is, the height of the paper sheet contact portion of the inner damper portion 15b is disposed between the paper sheet contact portion of the outer damper portion 15a and a bottom surface inside the printer 1.

Disposing such inner damper portion 15b causes even the inside wound label to be inserted to the paper passing route with the continuous paper Pb contacting the inner damper portion 15b. Accordingly, even with the inside wound label, the inner damper portion 15b can give enough tension to the continuous paper Pb to feed the continuous paper Pb properly and ensure the printing quality.

Additionally, supporting the inner damper portion 15b in the outer damper portion 15a pivotally can add the printer 1 a damper function that is possible to give enough tension even to the inside wound label without increasing a size of the printer 1.

On a lower portion of the outer damper portion 15a, a width adjustment guiding portion 27 is movably installed along an axial direction of the rotary shafts S3 and S4. The width adjustment guiding portion 27 is a configuration portion that abuts on both ends of the width direction of the continuous paper P fed from the paper sheet supply unit 10, and guides the feed of the continuous paper P. This width adjustment guiding portion 27 is coupled to a guide operating portion 28 on a back side of the outer damper portion 15a. This guide operating portion 28 is a tab for, while moving the width adjustment guiding portion 27 according to the width of the continuous paper P, fixing a position of the width adjustment guiding portion 27.

According to the embodiment, on the bottom surface inside the printer 1 below the damper portion 15, a depression portion 29 (see FIG. 6) is partially formed. The depression portion 29 is formed in closed states of the printing head portion 13 and the damper portion 15, so that a lower portion of the width adjustment guiding portion 27 is positioned below the bottom surface inside the printer 1. The width adjustment guiding portion 27 includes a lower end portion but does not contact a bottom surface of the depression portion 29, and is away from the bottom surface of the depression portion 29 at only a predetermined distance. This lower end portion of the width adjustment guiding portion 27 may be formed, for example, in an arc-shape.

In a case where the depression portion 29 does not exist, when executing a so-called back feeding, which returns the continuous paper P from the printing unit 11 to a side of the paper sheet supply unit 10, the continuous paper P slacks to contact a bottom surface inside the printer 1. In this case, the continuous paper P is positioned lower than the lower end portion of the width adjustment guiding portion 27, and may fall outside the range determined by the width adjustment guiding portion 27. However, resuming the printing operation in this state causes the continuous paper P to go over the width adjustment guiding portion 27 and be fed in a state where the damper portion 15 does not function. As a result, a printing position displaces from a planned position, and thins a printing density to end up with a deteriorated printing quality. In particular, a continuous paper P of a narrower width easily deviates from the width adjustment guiding portion 27. The rolled continuous paper P loaded in the paper sheet supply unit 10 may slack due to a fictitious force by rotation.

In contrast to this, in a case where the depression portion 29 is disposed, the lower portion of the width adjustment guiding portion 27 of the damper portion 15 is positioned lower than a line on the bottom surface inside the printer 1, and the continuous paper P does not fall outside the range determined by the width adjustment guiding portion 27. Accordingly, when resuming the printing operation, the continuous paper P does not go over the width adjustment guiding portion 27, thus the damper portion 15 functions without being impaired. Therefore, the malfunctions, such as a printing position displacing from a planned position and thinning of a printing density, can be avoided to improve the printing quality of the printer 1.

The damper supporting member 25, which supports the above-described outer damper portion 15a, is supported within the printer 1 around of a rotary shaft S5 (see FIG. 5 and FIG. 6) on a front portion side in a state where a rear portion is swingable in a vertical direction.

On an upper portion of this damper supporting member 25, a long groove portion (induction portion) 25a (see FIG. 5), which extends along a longitudinal direction of the damper supporting member 25, is formed. To this long groove portion 25a, the pin 17b (see FIG. 8) of the above-described head support plate 17 is movably fitted along the long groove portion 25a. Thus, the head support plate 17, which supports the printing head portion 13, is engaged with the damper supporting member 25.

The damper supporting member 25 includes the rear portion, which while being biased in a direction opening above (direction where the entire damper portion 15 rises) around the rotary shaft S5 (see FIG. 5 and FIG. 6) by a torsion spring 30 (see FIG. 5) mounted on the rotary shaft S5, is suppressed by the suppression portion 17a while the suppression portion 17a of the head support plate 17 is positioned on a side of the outer damper portion 15a, and maintained in a closed state. On the other hand, when the printing head portion 13 closes, the suppression portion 17a returns to a suppression position from a suppression release position along the long groove portion 25a of the damper supporting member 25. Then the rear portion of the damper supporting member 25 decreases opposing the biasing force of the torsion spring 30 and the damper portion 15 also is decreased automatically.

The opening and closing mechanism of the damper portion 15 is not limited to the above-described configuration. Also, for example, the opening and closing mechanism of the damper portion 15 may be as follows. That is, the rear portion of the damper supporting member 25 may be biased in a direction closing around the rotary shaft S5 by the torsion spring 30 mounted on the rotary shaft S5 (direction where the entire damper portion 15 is decreased). In this case, when the printing head portion 13 opens, as the suppression portion 17a moves from the suppression position to the suppression release position along the long groove portion 25a, the rear portion of the damper supporting member 25 is pulled to rise. Thus, the rear portion of the damper portion 15 opens in conjunction with an opening operation of the printing head portion 13. On the other hand, when the printing head portion 13 closes, as the suppression portion 17a moves from the suppression release position to the suppression position along the long groove portion 25a, the rear portion of the damper supporting member 25 is decreased by an action of the torsion spring 30, and the damper portion 15 also is decreased. Thus, the rear portion of the damper portion 15 closes in conjunction with a closing operation of the printing head portion 13. In this case, the biasing force of the torsion spring 21 on a side of the printing head portion 13 is configured to be larger than the biasing force of the torsion spring 30 on a side of the damper supporting member 25.

Figure 8:
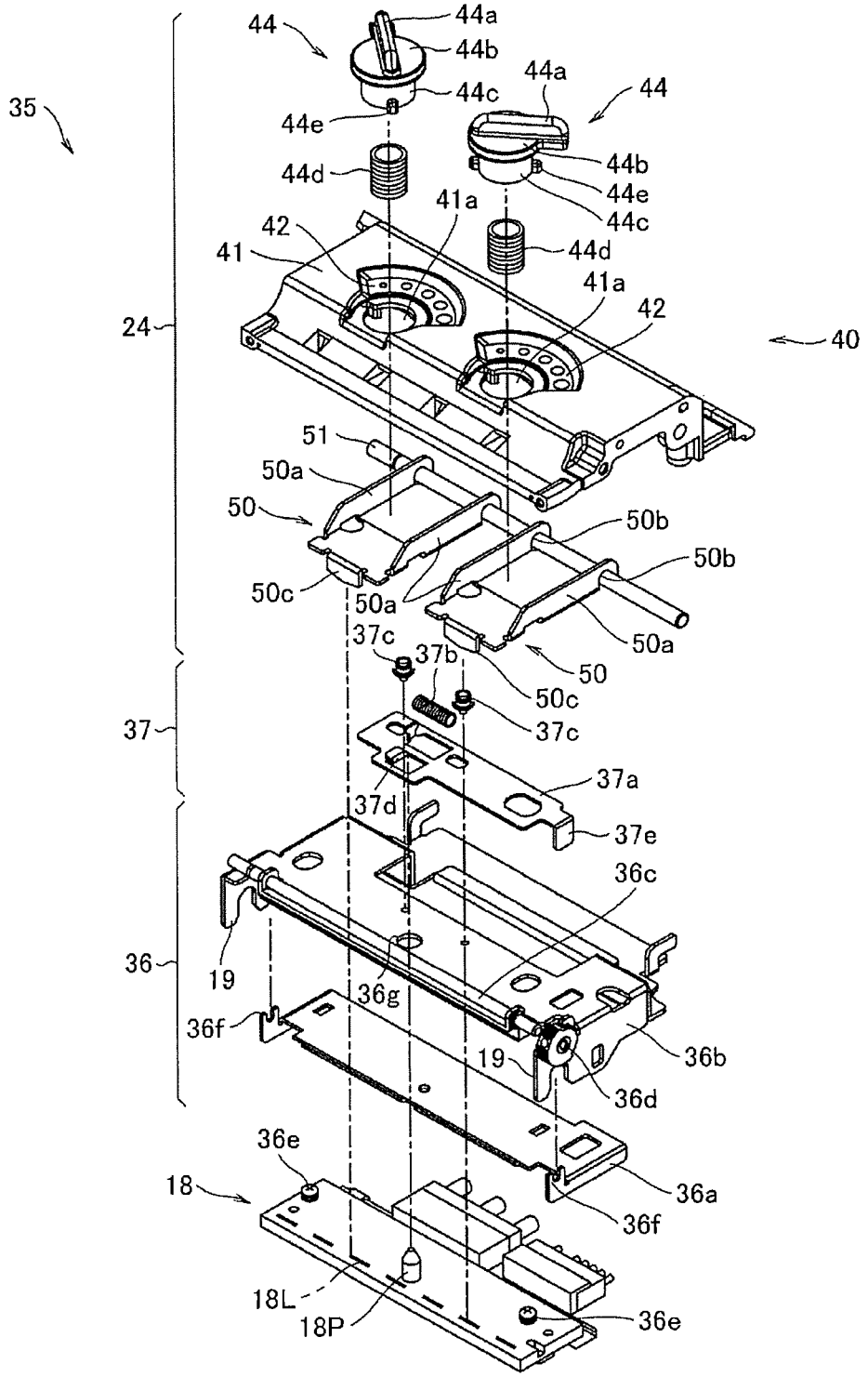
FIG. 8 is an exploded perspective view of a head mechanism.
Figure 9:
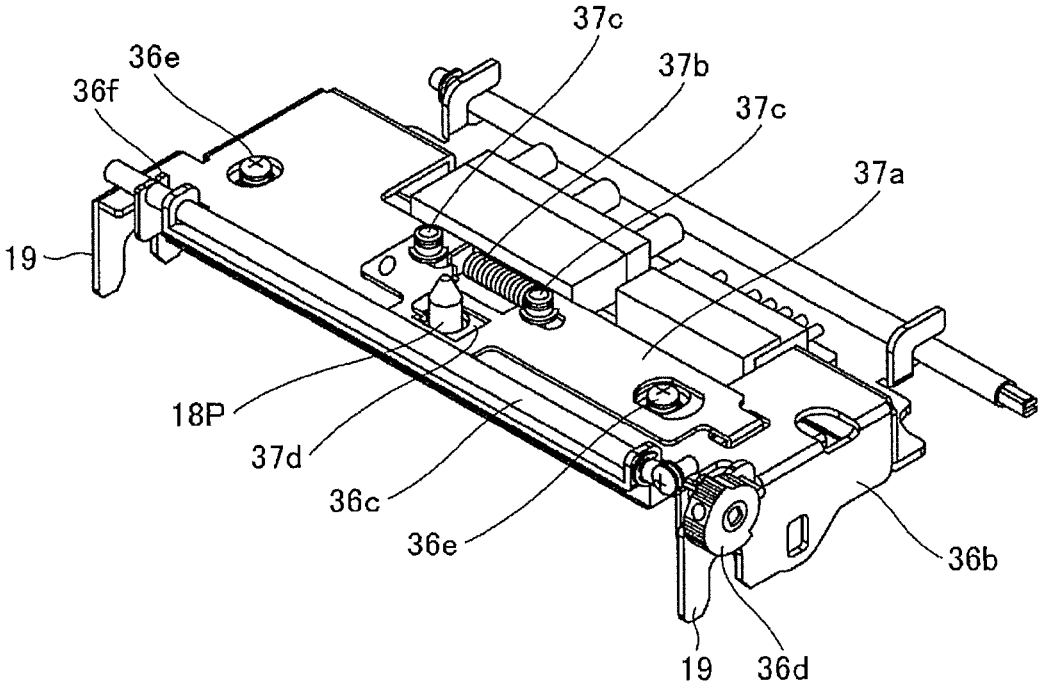
FIG. 9 is a perspective view illustrating an assembled state of a head slider portion and a head holding portion which constitute the head mechanism in FIG. 8.
Figure 10:
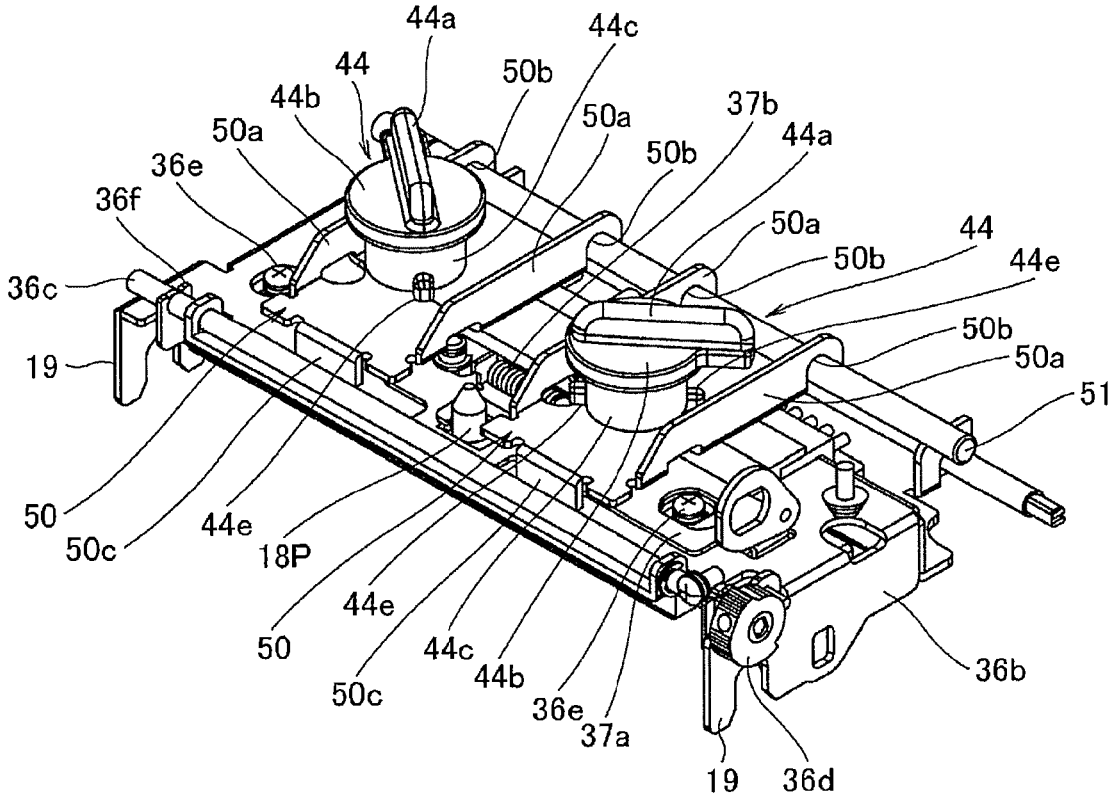
FIG. 10 is a perspective view illustrating an assembled state of the head mechanism in FIG. 8.

Next, a head mechanism disposed on the printing head portion 13 will be described in reference to FIG. 8 to FIG. 10. FIG. 8 is a main part exploded perspective view of the head mechanism. FIG. 9 is a perspective view illustrating an assembled state of a head slider portion and a head holding portion which constitute the head mechanism in FIG. 8. FIG. 10 is a perspective view illustrating an assembled state of the head mechanism in FIG. 8. It should be noted that, in FIG. 10, an operating surface plate of the pressing device is omitted to make a state inside the head mechanism easier to see.

As illustrated in FIG. 8, a head mechanism 35 includes a head slider portion 36, a head holding portion 37 and the pressing device 24 in the order from the lower side.

The head slider portion 36 is a mechanism that moves a position of the printing line 18L of the thermal head portion 18 back and forth (front and rear along the feed direction of the continuous paper P) corresponding to the type of the print medium (such as thickness and hardness). The head slider portion 36 includes a lower layer plate 36a, an upper layer plate 36b, a rotary shaft 36c and a gear 36d.

The lower layer plate 36a is fixed to a back surface of the thermal head portion 18 (a back side surface of the printing surface) with screws 36e attachably/detachably. In a front side of this lower layer plate 36a, parts at both ends in a longitudinal direction of the lower layer plate 36a (the width direction of the continuous paper P) are bent upward, and their upper tip portions have depressed hook portions 36f 36f formed.

Above the lower layer plate 36a, the upper layer plate 36b is installed. The upper layer plate 36b supports the rotary shaft 36c rotatably. Both ends of the rotary shaft 36c in a longitudinal direction fit in the above-described depressed hook portions 36f, 36f of the lower layer plate 36a. This engages the lower layer plate 36a with the rotary shaft 36c.

One end of the rotary shaft 36c is coupled with the gear 36d. On the rotary shaft 36c, a portion where the depressed hook portions 36f is engaged, and the rotary shaft portion between them and the center of the gear 36d are decentered. In view of this, the rotation of the gear 36d causes the lower layer plate 36a engaged with the rotary shaft 36c to move back and forth. This can change the position of the printing line 18L of the thermal head portion 18 to the appropriate position corresponding to the type of the print medium (such as thickness and hardness), thus the printing quality can be improved.

The upper layer plate 36b has a hole portion 36g (see FIG. 8) formed to penetrate its top and inferior surfaces. In this hole portion 36g, a protrusion 18P disposed in the back surface of the thermal head portion 18 is inserted.

The above-described head holding portion 37 is a mechanism that holds the thermal head portion 18 attachably/detachably. The head holding portion 37 includes a pressing plate 37a and a coil spring 37b.

The pressing plate 37a is installed on the upper layer plate 36b with screws 37c, 37c in a state of being slightly movable along its longitudinal direction (the width direction of the continuous paper P). This pressing plate 37a has a hole portion 37d formed to penetrate its top and inferior surfaces. Through this hole portion 37d, the above-described protrusion 18P is inserted. One end of the pressing plate 37a in the longitudinal direction is bent downward, and a head-hold releasing portion 37e (see FIG. 8) is formed on the one end. A lower tip portion of this head-hold releasing portion 37e projects to the inferior surface of the printing head portion 13.

The coil spring 37b is mounted between the screws 37c, 37c. The pressing plate 37a is biased to a direction pressing the protrusion 18P by the coil spring 37b. This holds the thermal head portion 18.

When removing the thermal head portion 18, release the pressing by the pressing plate 37a on the protrusion 18P, by moving the above-described head-hold releasing portion 37e of the pressing plate 37a to the opposite direction with respect to the biasing force of the coil spring 37b. On the other hand, when installing the thermal head portion 18, press the thermal head portion 18 in a state where the protrusion 18P is inserted in the hole portion 36g, 37d. Accordingly, the attachment and detachment of the thermal head portion 18 can be facilitated.

Figure 11:
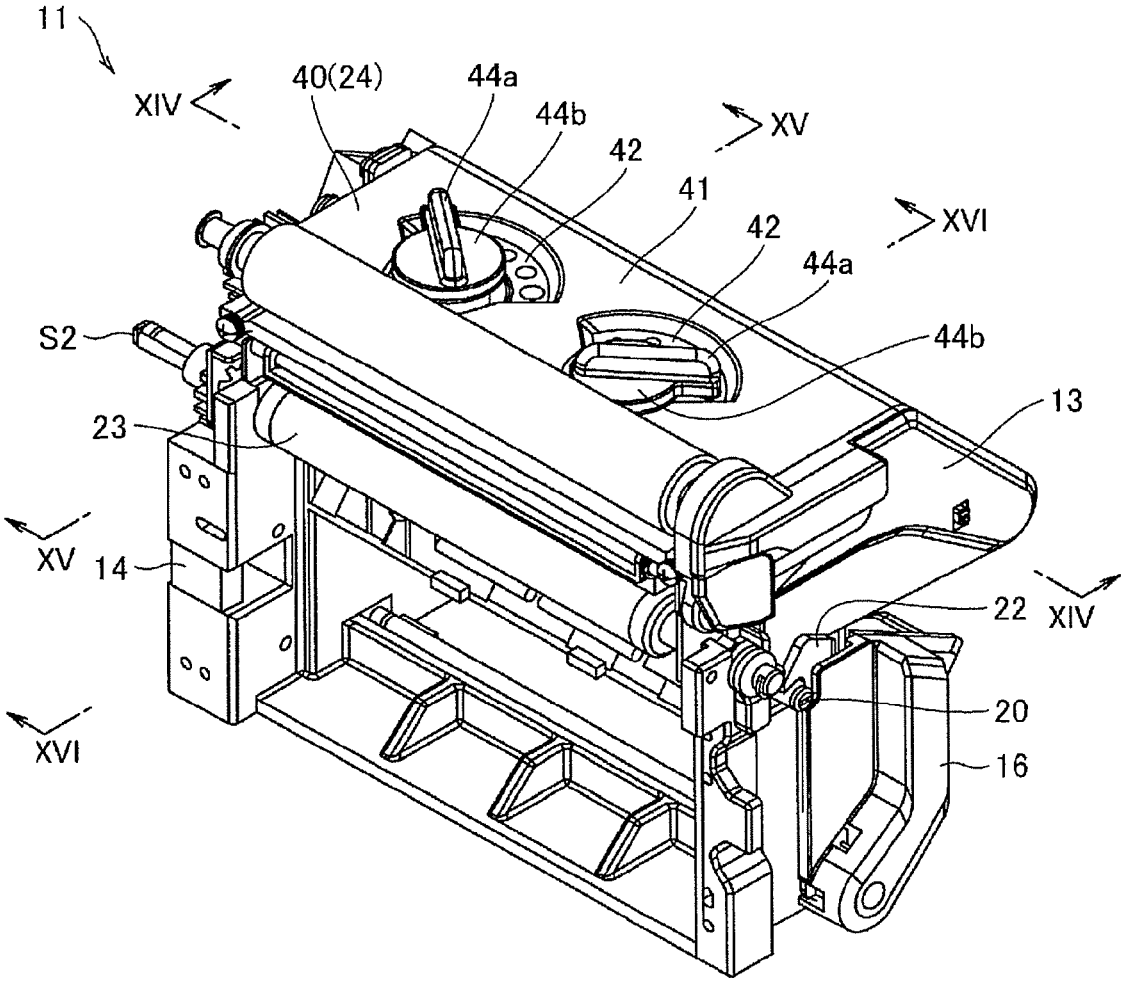
FIG. 11 is a perspective view of the printing unit of the printer in FIG. 1 viewed from the front side.
Figure 12A:
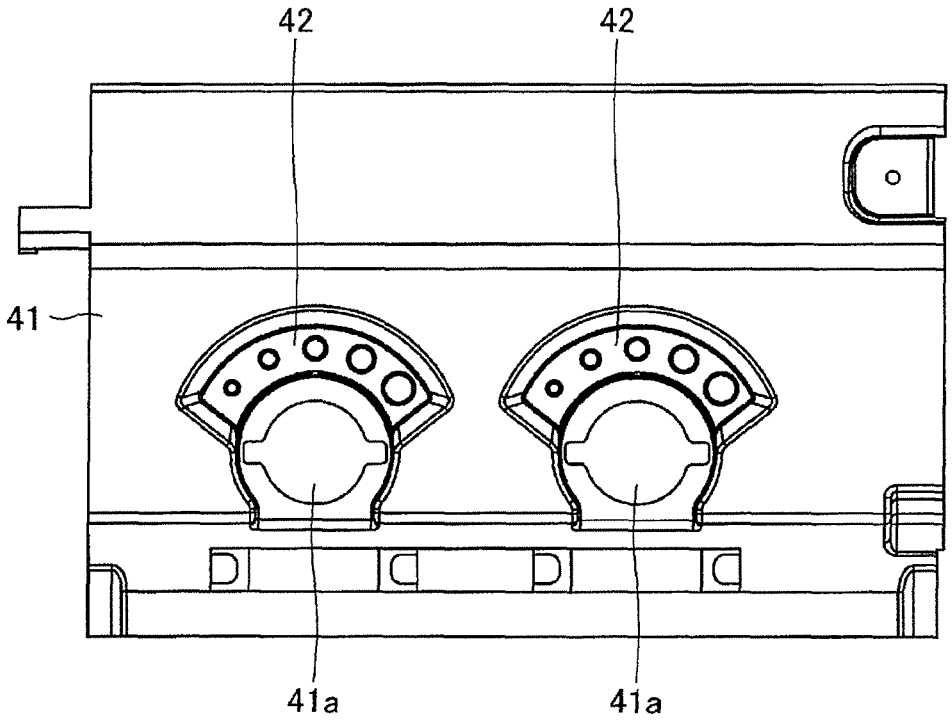
FIG. 12A is a plan view of a top surface of an operating surface plate which constitutes an operational panel unit of a pressing device.
Figure 12B:
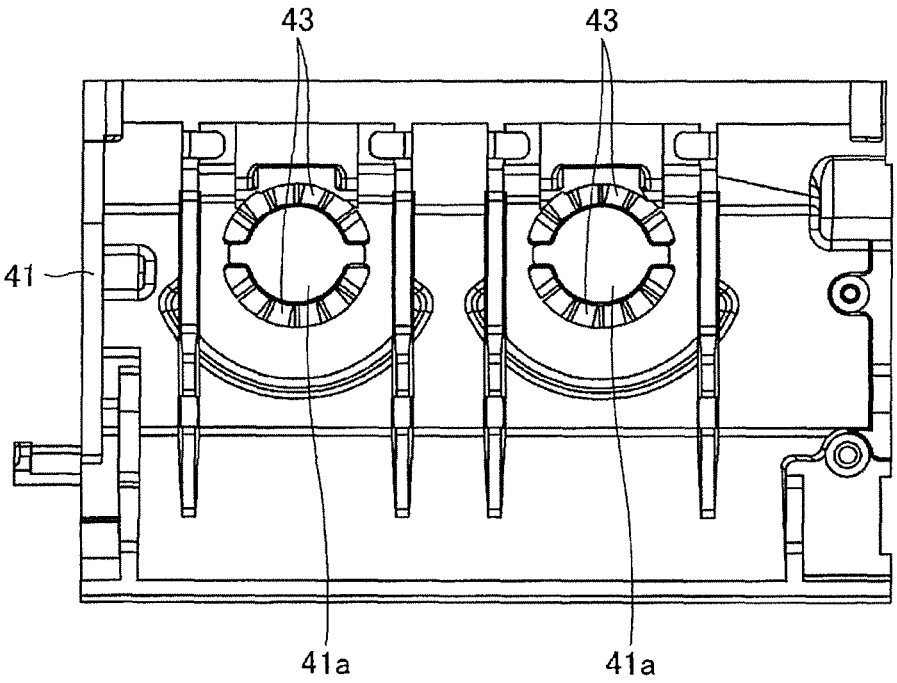
FIG. 12B is a plan view of a back surface of the operating surface plate in FIG. 12A.
Figure 13A:
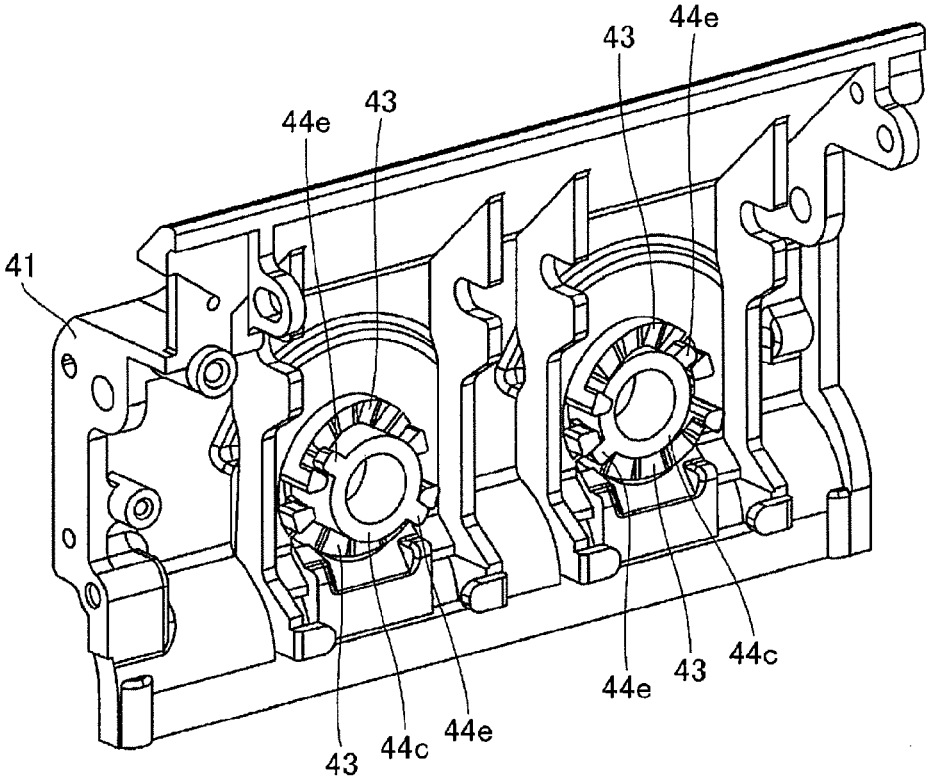
FIG. 13A is a perspective view of the operating surface plate in FIG. 12A viewed from a back side.
Figure 13B:
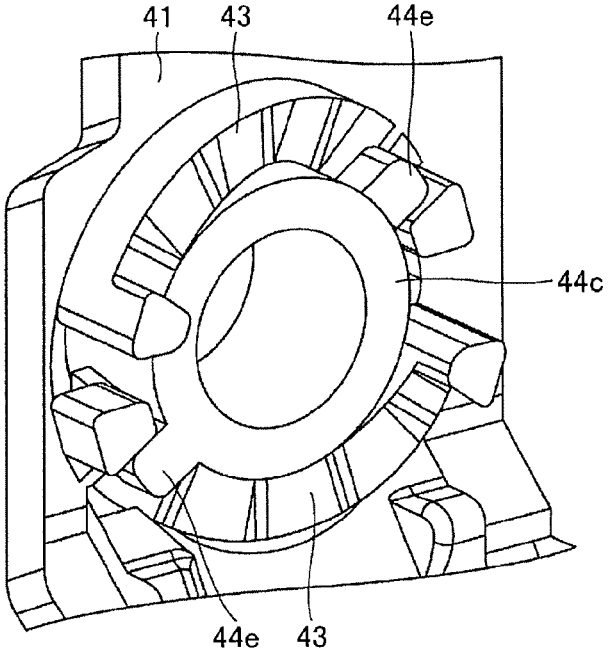
FIG. 13B is a main part enlarged perspective view of the back surface of the operating surface plate in FIG. 13A.
Figure 14:
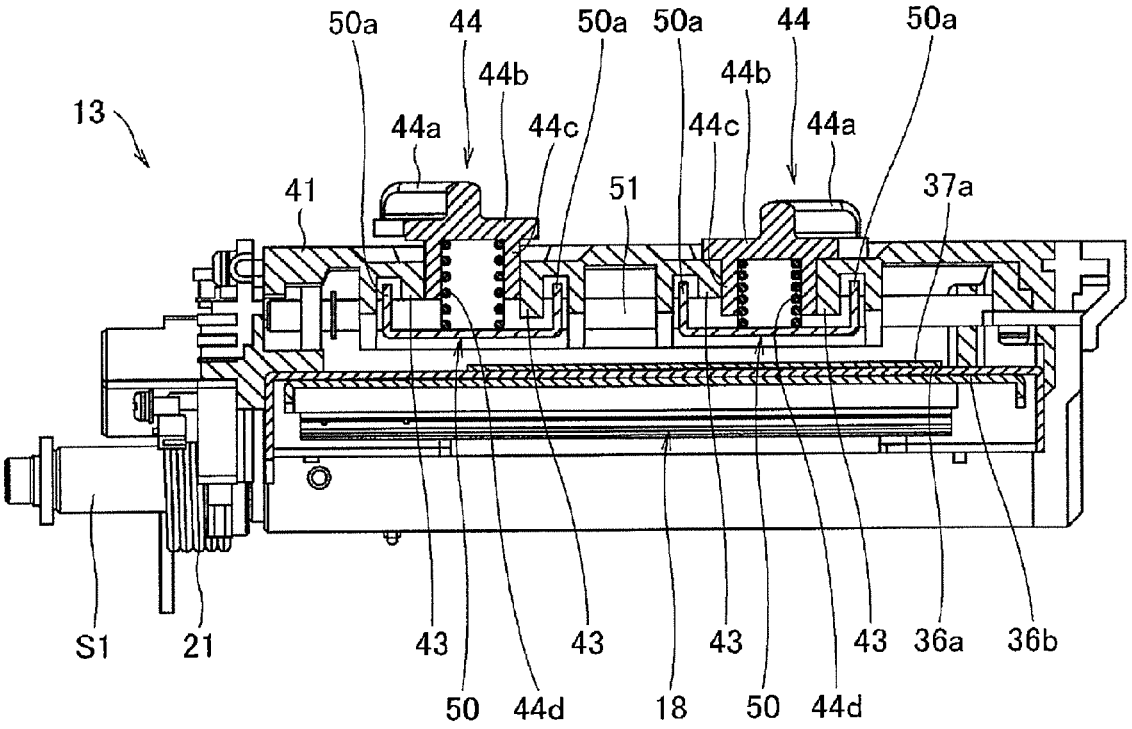
FIG. 14 is a cross-sectional view of a XIV-XIV line of the printing head portion in FIG. 11.
Figure 15:
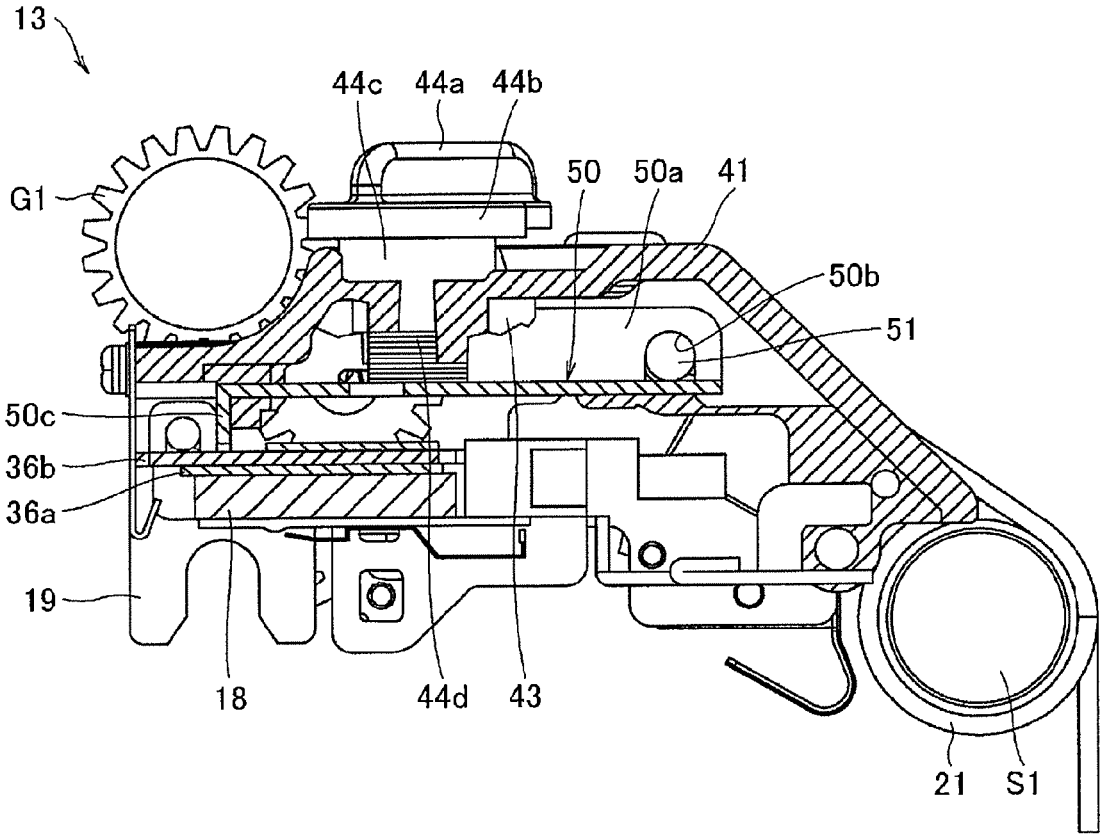
FIG. 15 is a cross-sectional view of a XV-XV line of the printing head portion in FIG. 11.
Figure 16:
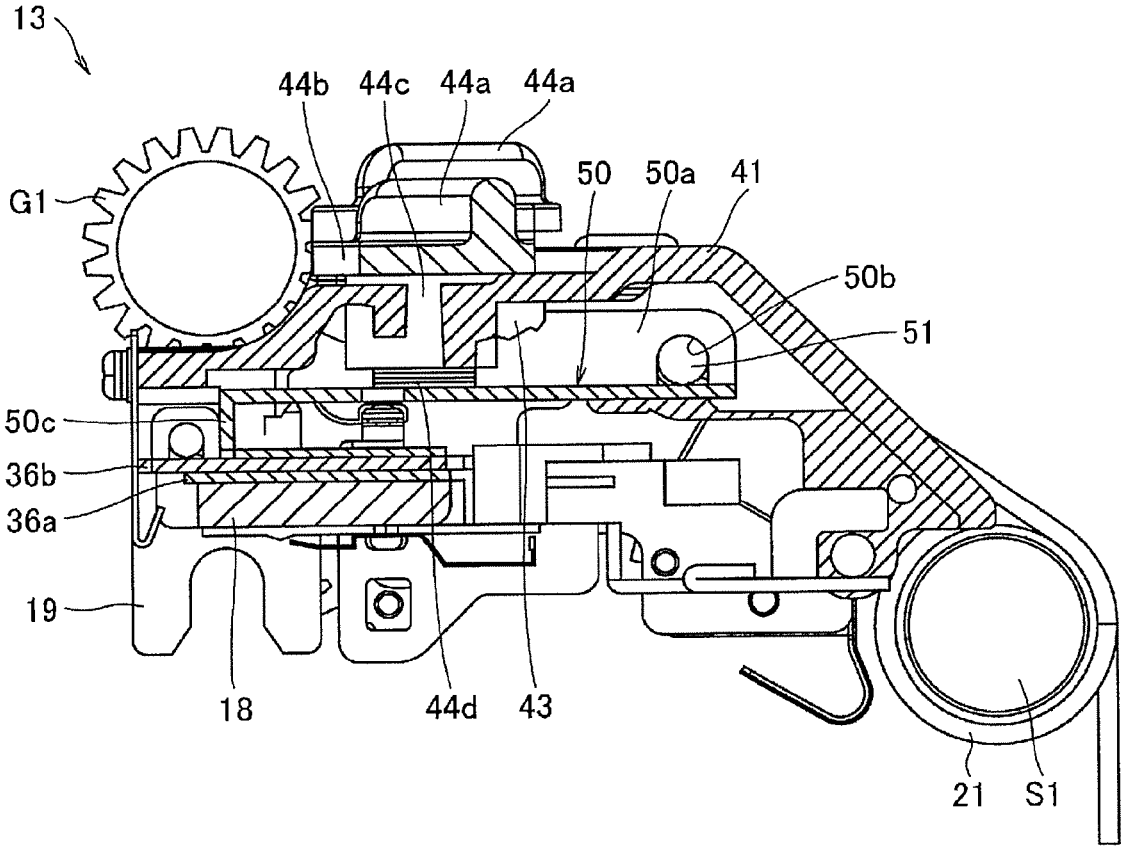
FIG. 16 is a cross-sectional view of a XVI-XVI line of the printing head portion in FIG. 11.

Next, the pressing device 24 will be described in reference to FIG. 8, FIG. 10 and FIG. 11 to FIG. 16. FIG. 11 is a perspective view of the printing unit viewed from the front side. FIG. 12A is a plan view of a top surface of an operating surface plate which constitutes an operational panel unit of a pressing device. FIG. 12B is a plan view of a back surface of the operating surface plate in FIG. 12A. FIG. 13A is a perspective view of the operating surface plate in FIG. 12A viewed from a back side. FIG. 13B is a main part enlarged perspective view of the back surface of the operating surface plate in FIG. 13A. FIG. 14 is a cross-sectional view of a XIV-XIV line of the printing head portion in FIG. 11. FIG. 15 is a cross-sectional view of a XV-XV line of the printing head portion in FIG. 11. FIG. 16 is a cross-sectional view of a XVI-XVI line of the printing head portion in FIG. 11. It should be noted that FIG. 14 to FIG. 16 are cross-sectional views, and only a few parts in the drawings are hatched to make the drawings easier to see.

As illustrated in FIG. 8, the pressing device 24 includes a pressure operating panel unit (pressing-force adjustment portion) 40 and a head pressure plate (pressing member) 50.

The pressure operating panel unit 40 is a mechanism that adjusts a pressing force against the printing line 18L of the thermal head portion 18. The pressure operating panel unit 40 is disposed on a top surface of the printing head portion 13, as illustrated in FIG. 11. There are some cases where the pressure operating panel unit 40 is disposed on a side surface of the printing head portion 13. In such a case, a structure of the pressing device becomes complicated, and a size of the printer becomes large. In contrast to this, according to this embodiment, the pressure operating panel unit 40 of the pressing device 24 is disposed on the top surface of the printing head portion 13, which achieves a simple structure of the pressing device 24, and the downsizing of the printer 1. Additionally, a visibility of the pressure operating panel unit 40 is improved, thus an operability of the pressing device 24 can be improved.

The pressure operating panel unit 40 includes an operating surface plate 41, a pressing force display unit 42, a pressing force changing portion 43 (see FIG. 12B and FIG. 13) and an operating portion 44.

The operating surface plate 41 is mounted on the top surface of the printing head portion 13. On a top surface of this operating surface plate 41, for example, a depressed area in an approximately planar fan-shape is formed in two positions along the width direction of the continuous paper P, and the pressing force display unit 42 is formed in the depressed area.

On the pressing force display unit 42, for example, five circles of which diameters gradually become larger or smaller along an arc of the fan are provided. For example, here, the larger the diameter of the circle is, the larger the pressing force is.

Each depressed area of the operating surface plate 41 has a hole portion 41a (see FIG. 12) formed to penetrate top and inferior surfaces of the operating surface plate 41. In a peripheral area of the hole portion 41a on a back surface of the operating surface plate 41, the pressing force changing portion 43 is formed. The pressing force changing portion 43 is formed to be a stepwise shape such that the projection heights change in stages along the circumferential direction of the hole portion 41a (see FIG. 13).

In the position of the hole portion 41a in each depressed area of the operating surface plate 41, the operating portion 44 is installed in a rotatable state with respect to an inside surface of the operating surface plate 41. The operating portion 44 has, as illustrated in FIG. 8, a tab portion 44a, a large-diameter portion 44b, a small-diameter portion 44c, a coil spring (elastic member) 44d and a protrusion 44e.

The tab portion 44a is integrally molded on a top surface of the large-diameter portion 44b. A part of this tab portion 44a extends outside of an outer periphery of the top surface of the large-diameter portion 44b. Rotating the operating portion 44 with holding this extended end of the tab portion 44a can rotate the operating portion 44 with relatively small force due to the principle of leverage.

The small-diameter portion 44c is integrally molded under a back surface of the large-diameter portion 44b. The small-diameter portion 44c is formed to be cylindrical, and the coil spring 44d (see FIG. 8, FIG. 14 and FIG. 15) is mounted within its cylinder. The coil spring 44d is a member to press the head pressure plate 50 by abutting approximately on the middle of the head pressure plate 50 in the longitudinal direction.

The small-diameter portion 44c is inserted in the hole portion 41a of the operating surface plate 41. On an outer periphery of the small-diameter portion 44c, which projects from this hole portion 41a, the protrusion 44e is formed to project in a radial direction of the small-diameter portion 44c. This protrusion 44e contacts the stepped surface of the pressing force changing portion 43. This causes the rotation of the operating portion 44 to change the projection length of the small-diameter portion 44c in stages that corresponds to the level difference of the steps of the pressing force changing portion 43, and the pressing force of the coil spring 44d against the head pressure plate 50 (that is, the thermal head portion 18) change in stages.

The left side in FIG. 14 and the operating portion 44 in FIG. 15 illustrate example states before the thermal head portion 18 is pressed. The coil spring 44d of the operating portion 44 is not in contact with the head pressure plate 50. Meanwhile, the right side in FIG. 14 and the operating portion 44 in FIG. 16 illustrate example states while the thermal head portion 18 is pressed with the highest force. The coil spring 44d of the operating portion 44 is in contact with the head pressure plate 50, and pressing the head pressure plate 50.

The above-described head pressure plate 50 is a member to transmit the pressing force from the operating portion 44 of the pressure operating panel unit 40 to the printing line 18L of the thermal head portion 18. The head pressure plate 50 is installed between the operating surface plate 41 and the thermal head portion 18 in a state of being extended to connect a pressing portion of the coil spring 44d of the operating portion 44 and the printing line 18L of the thermal head portion 18.

Here, since two operating portions 44 are disposed, the head pressure plate 50 is also disposed, for example, two, corresponding to it. Thus, by disposing a plurality of head pressure plates 50, the continuous paper P of various widths can be pressed properly, and the proper printing onto the continuous paper P of various widths can be achieved.

Each head pressure plate 50 has both ends in the width direction bent upward, and bent portions 50a are formed on the end portions. This ensures the head pressure plate 50 both mechanical strength and weight reduction.

On this bent portion 50a, a hole portion 50b is formed in a rear edge side on the head pressure plate 50 in the longitudinal direction. In this hole portion 50b, a rotary shaft 51 is inserted. With this, the head pressure plate 50 is pivotally supported by the rotary shaft 51 in a state where its front side end portion swingable in a vertical direction around the rotary shaft 51. Accordingly, the height of the front side end portion of the head pressure plate 50 can be adjusted corresponding to the print medium thickness, thus the proper printing on the continuous paper P of various thickness can be performed.

A front side end portion of the head pressure plate 50 in the longitudinal direction is bent downward, and a protrusion 50c is formed on the end portion. This protrusion 50c is configured to press a back side of the printing line 18L of the thermal head portion 18 locally. Between both the ends of the head pressure plate 50 in the longitudinal direction, the above-described coil spring 44d of the operating portion 44 contacts to press the head pressure plate 50.

Figure 17A:
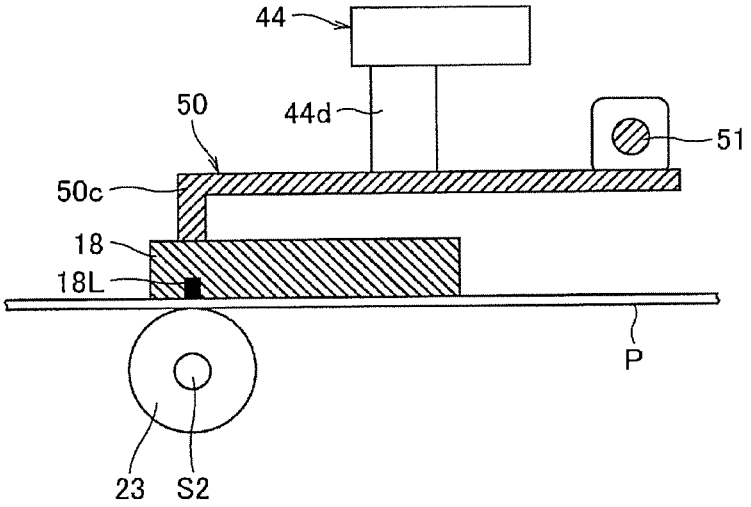
FIG. 17A is a schematic cross-sectional view of the printing unit before a thermal head portion is pressed.
Figure 17B:
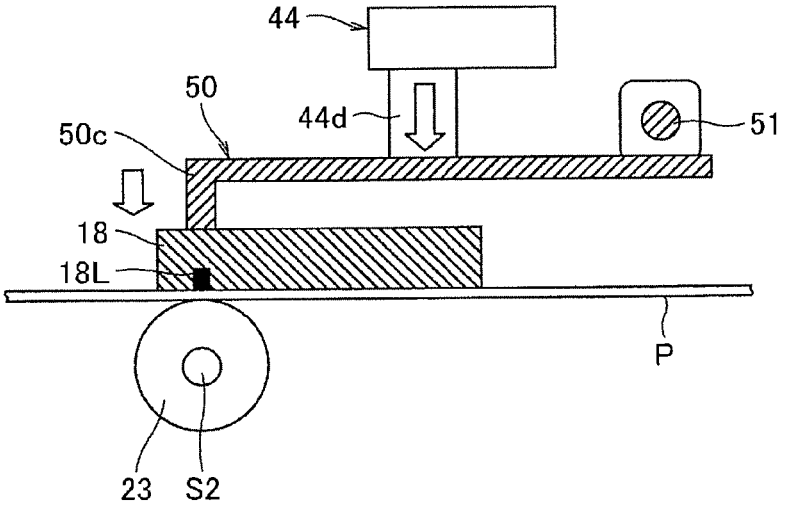
FIG. 17B is a schematic cross-sectional view of the printing unit while the thermal head portion is being pressed.

Next, actions of the pressing device 24 will be described in reference to FIG. 17A and FIG. 17B. FIG. 17A is a schematic cross-sectional view of the printing unit before a thermal head portion is pressed. FIG. 17B is a schematic cross-sectional view of the printing unit while the thermal head portion is being pressed.

During the printing process, when the printing line 18L of the thermal head portion 18 fails to be in contact closely enough with the print medium, the heat of the heating resistors of the printing line 18L is not transmitted onto the print medium properly, thus the printing quality deteriorates. In view of this, the printing is performed in a state where the printing line 18L is closely contacted with the print medium by the thermal head portion 18 being pressed on a side of the platen roller portion 23 during the printing process.

Besides thin and relatively soft materials such as the continuous paper P with labels, the print medium has thick and relatively hard materials such as tags. The pressing force against the thermal head portion is adjusted corresponding to each material to achieve the close contact between the printing line and the print medium.

To press the printing line 18L effectively, it is preferable to dispose the operating portion 44 immediately above the printing line 18L. However, since another member is arranged immediately above the printing line 18L, disposing the operating portion 44 immediately above the printing line 18L causes increased size of the printer 1.

Therefore, according to the embodiment, as illustrated in FIG. 17A, the operating portion 44 is disposed rearward with respect to the printing line 18L, and the head pressure plate 50 is disposed in between the pressing portion of the coil spring 44d of the operating portion 44 and the printing line 18L to connect them.

In this way, as illustrated in FIG. 17B, the pressing force of the coil spring 44d of the operating portion 44 can be transmitted to the printing line 18L of the thermal head portion 18 locally by the head pressure plate 50 and the protrusion 50c. As a result, the pressing force by the operating portion 44 of the pressure operating panel unit 40 can be transmitted to the printing line 18L of the thermal head portion 18 effectively without causing the size of the printer 1 to become larger. Accordingly, the printing line 18L can be pressed effectively to improve the printing quality.

As described above, the invention made by the present inventor has been described specifically based on the embodiment. However, it should be understood that the embodiment disclosed herein is for illustrative purposes in all respects, and is not limited to the technique disclosed. That is, the technical scope of the present invention should not be construed in a restrictive manner based on the description in the embodiment, should be construed in accordance with the description in a range of the claim as a principle, and the technique identical to the technique disclosed in a range of the claim and all changes within the scope of the claim are included.

According to the embodiment, a case that a continuous paper, which includes a plurality of labels adhered temporarily on a liner sheet, is used as a print medium has been described, but this should not be construed in a limiting sense; for example, a continuous label including an adhesive surface on one surface (label without liner sheet), a continuous sheet without an adhesive surface (continuous sheet), or, not limited to papers, a printable film by a thermal head or a similar film can be used as a print medium. The label without liner sheet, the continuous sheet, or the film can include a position detection mark. In the case where the label without liner sheet, where an adhesive is exposed, or a similar label is fed, a roller including silicone may be disposed while a non-adhesive coating is applied to a feed path.

In the above description, the present invention has been described in a case applying to a stand-alone type printer, where an input operation to the printer is executed without a personal computer, but this should not be construed in a limiting sense; for example, the present invention may also apply to an on-line type printer, where the input operation to the printer is executed via the personal computer.

This application claims the priority based on Patent Application No. 2013-268264 filed in the Japan Patent Office on Dec. 26, 2013, and every content of this application is incorporated herein by reference.

The invention claimed is:

1. A printer comprising:

a feeding unit configured to feed a print medium along a medium feed path;

a printing unit disposed to oppose the feeding unit in the medium feed path, the printing unit being configured to print on the print medium fed along the medium feed path; and a pressing unit configured to press the printing unit onto the feeding unit in a state where the print medium is nipped between the printing unit and the feeding unit, wherein the pressing unit includes:

a pressing-force adjustment portion disposed at an upstream side in a feed direction of the print medium with respect to a printing portion of the printing unit, the pressing-force adjustment portion adjusting a pressing force on the printing unit; and a pressing member disposed between the pressing-force adjustment portion and the printing unit in a state where the pressing member connects a pressing portion of the pressing-force adjustment portion and the printing portion of the printing unit, the pressing member being configured to transmit the pressing force from the pressing-force adjustment portion to the printing portion through a tip end of the pressing member, *and*

*an elastic member separated from a location where the pressing force is transmitted to the printing portion.*

2. The printer according to claim 1, wherein the pressing member has a bent portion formed by bending downward, and the tip end is a tip of the bent portion.

3. The printer according to claim 1, wherein the pressing-force adjustment portion includes:

an operating portion disposed to operate the pressing force on the printing unit;

a pressure changing unit disposed to be stepwise in order to change the pressing force on the printing unit; and

[an] *the* elastic member disposed in order to change the pressing force on the pressing member.

4. The printer according to claim 1, wherein the pressing-force adjustment portion includes:

an operating portion disposed movably to operate the pressing force on the printing unit;

a pressure changing unit disposed to be stepwise in order to change the pressing force on the printing unit in stages corresponding to a position where the operating portion moves; and

[an] *the* elastic member disposed in order to change the pressing force on the pressing member corresponding to the position where the operating portion moves.

5. The printer according to claim 1, wherein the pressing member is disposed swingably.

6. The printer according to claim 1, wherein a plurality of the pressing members are disposed along a width direction of the print medium.

*7. The printer according to claim 1, wherein*

*the pressing unit further comprises a rotary shaft that extends through a hole portion formed in a rear side of the pressing member such that a front side of the pressing member that includes the tip end of the pressing member is adjustable in a vertical direction around the rotary shaft.*

*8. The printer according to claim 7, wherein*

*the hole portion completely encloses the rotary shaft.*

*9. The printer according to claim 1, wherein*

*the pressing member consists of a single piece.*

*10. A printer comprising:*

*a platen roller configured to feed a print medium along a medium feed path;*

*a thermal head disposed to oppose the platen roller in the medium feed path, the thermal head being configured to print on the print medium fed along the medium feed path;*

*a pressing member configured to press the thermal head onto the platen roller in a state where the print medium is nipped between the platen roller and the thermal head, the pressing member being configured to exert an adjustable pressing force on the thermal head through a front side of the pressing member; and*

*an elastic member configured to generate force to adjust the adjustable pressing force exerted by the pressing member on the thermal head, wherein*

*the pressing member is pivotally supported by a rotary shaft at a rear side of the pressing member such that the front side of the pressing member is adjustable around the rotary shaft, and*

*the elastic member is (1) completely offset from the platen roller when the printer is viewed in a direction perpendicular to a feeding direction of the print medium and (2) separated from a location where the pressing member exerts force on the thermal head.*

*11. The printer according to claim 10, wherein*

*the pressing member comprises a hole portion that at least partially encloses the rotary shaft.*

*12. The printer according to claim 10, wherein*

*the pressing member consists of a single piece.*

*13. The printer according to claim 10, wherein*

*the pressing member has a downwardly extending protrusion.*

*14. The printer according to claim 13, wherein*

*the protrusion of the pressing member is aligned with a printing line of the thermal head and the platen roller when the printer is viewed in a direction perpendicular to the feeding direction of the print medium.*

*15. The printer according to claim 13, wherein*

*the protrusion is provided at the front side of the pressing member configured to press a back of a printing line of the thermal head.*

*16. The printer according to claim 10, wherein*

*the elastic member is configured to adjust the adjustable pressing force in a stepwise manner.*

*17. The printer according to claim 10, further comprising:*

*a rotatable operating portion configured to increase or decrease a compression of the elastic member such that the adjustable pressing force is correspondingly increased or decreased.*

*18. The printer according to claim 17, wherein*

*the operating portion is configured to rotate in a first direction in which the compression of the elastic member is increased and in a second direction opposite to the first direction in which the compression of the elastic member is decreased such that the adjustable pressing force is respectively increased or decreased as the operating portion rotates.*

*19. The printer according to claim 10, wherein*

*the elastic member is configured to act directly upon the pressing member to adjust the adjustable pressing force exerted by the pressing member on the thermal head.*

* * * * *